United States Patent [19]

Schneider

[11] Patent Number: 5,054,287

[45] Date of Patent: Oct. 8, 1991

[54] EXTENDED TEMPERATURE RANGE ROCKET INJECTOR

[75] Inventor: Steven J. Schneider, Rocky River, Ohio

[73] Assignee: The United States of America as represented by the Administrator of the National Aeronautics and Space Administration, Washington, D.C.

[21] Appl. No.: 443,523

[22] Filed: Nov. 30, 1989

[51] Int. Cl.$^5$ .............................................. F02R 9/52
[52] U.S. Cl. .................................... 60/240; 60/258; 60/39.281
[58] Field of Search ................ 60/240, 257, 258, 260, 60/263, 39.27, 39.281, 240, 260, 243, 257, 258

[56] References Cited

U.S. PATENT DOCUMENTS

| | | | |
|---|---|---|---|
| 2,536,597 | 1/1951 | Goddard | 60/35.6 |
| 2,714,286 | 8/1955 | Zucrow | 60/35.6 |
| 2,906,091 | 9/1959 | Kretschmer | 60/39.29 |
| 2,930,187 | 3/1960 | Chillson et al. | 60/260 |
| 3,308,619 | 3/1967 | Richardson et al. | 60/240 |
| 3,417,563 | 12/1968 | Loprete | 60/240 |
| 3,611,722 | 5/1967 | Shick | 690/258 |
| 3,613,375 | 10/1971 | Abild | 60/39.27 |
| 3,662,960 | 5/1972 | Mitchell et al. | 239/400 |
| 3,740,946 | 6/1973 | Welton et al. | 60/204 |
| 4,081,136 | 3/1978 | Addoms et al. | 239/127.1 |
| 4,777,794 | 10/1988 | Nielsen | 60/240 |

Primary Examiner—Louis J. Casaregola
Assistant Examiner—John A. Savio, III
Attorney, Agent, or Firm—Gene E. Shook; John R. Manning; James A. Mackin

[57] ABSTRACT

A rocket injector is provided with multiple sets of manifolds for supplying propellants to injector elements. Sensors transmit the temperatures of the propellants to a suitable controller which is operably connected to valves between these manifolds and propellant storage tanks. When cryogenic propellant temperatures are sensed only a portion of the valves are opened to furnish propellants to some of the manifolds. When lower temperatures are sensed additional valves are opened to furnish propellants to more of the manifolds.

2 Claims, 2 Drawing Sheets

EXTENDED TEMPERATURE RANGE ROCKET INJECTOR

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with an improved injector for a liquid rocket. The invention is particularly directed to improving the propellant temperature/pressure range of liquid rocket operations.

Prior art devices fail to provide for the operation of liquid rockets over an extended range of propellant inlet temperatures. Moreover, the use of conventional injectors produces unacceptable fuel and oxidizer injector pressure drop when operation over an extended range of propellant inlet temperatures is attempted. Injector pressure drop outside of the acceptable range can result in combustion chamber instability.

It is, therefore, an object of the present invention to improve liquid rocket operations using propellants with a wide range of propellant inlet temperatures from cryogenic to ambient.

A further object of the invention is to improve the operation of a liquid rocket in which a wide range of propellant inlet densities is encountered.

BACKGROUND ART

U.S. Pat. No. 3,662,960 to Mitchell et al describes a rocket injector head with multiple inlets to control pressure drop. U.S. Pat. No. 4,081,136 to Addoms et al is concerned with multiple chamber inlets with undivided valve control for the purposes of controlling inlet pressure.

U.S. Pat. No. 2,536,597 to Goddard describes a recoil operated feeding apparatus for a combustion chamber in which successive charges of the combustion mixture are ignited. U.S. Pat. No. 2,714,286 to Zucrow describes a liquid propellant injector system utilizing a plurality of propellant injectors, each introducing only a small proportion of the total amount of propellant fed into the combustion chamber. U.S. Pat. No. 3,740,946 to Welton et al is directed to a momentum exchange throttling injector for varying propellant flow rates and consequently liquid rocket engine thrust levels over wide ranges.

DISCLOSURE OF THE INVENTION

The objects of the invention are achieved with multiple sets of manifolds in the injector. Each set of manifolds uses a set of valves to control fluid flow through the connected injector elements to the rocket chamber.

DESCRIPTION OF THE DRAWING

The objects, advantages, and novel features of the invention will be more fully apparent from the following detailed description when read in connection with the accompanying drawing wherein.

BEST MODE FOR CARRYING OUT THE INVENTION

Figure 1:
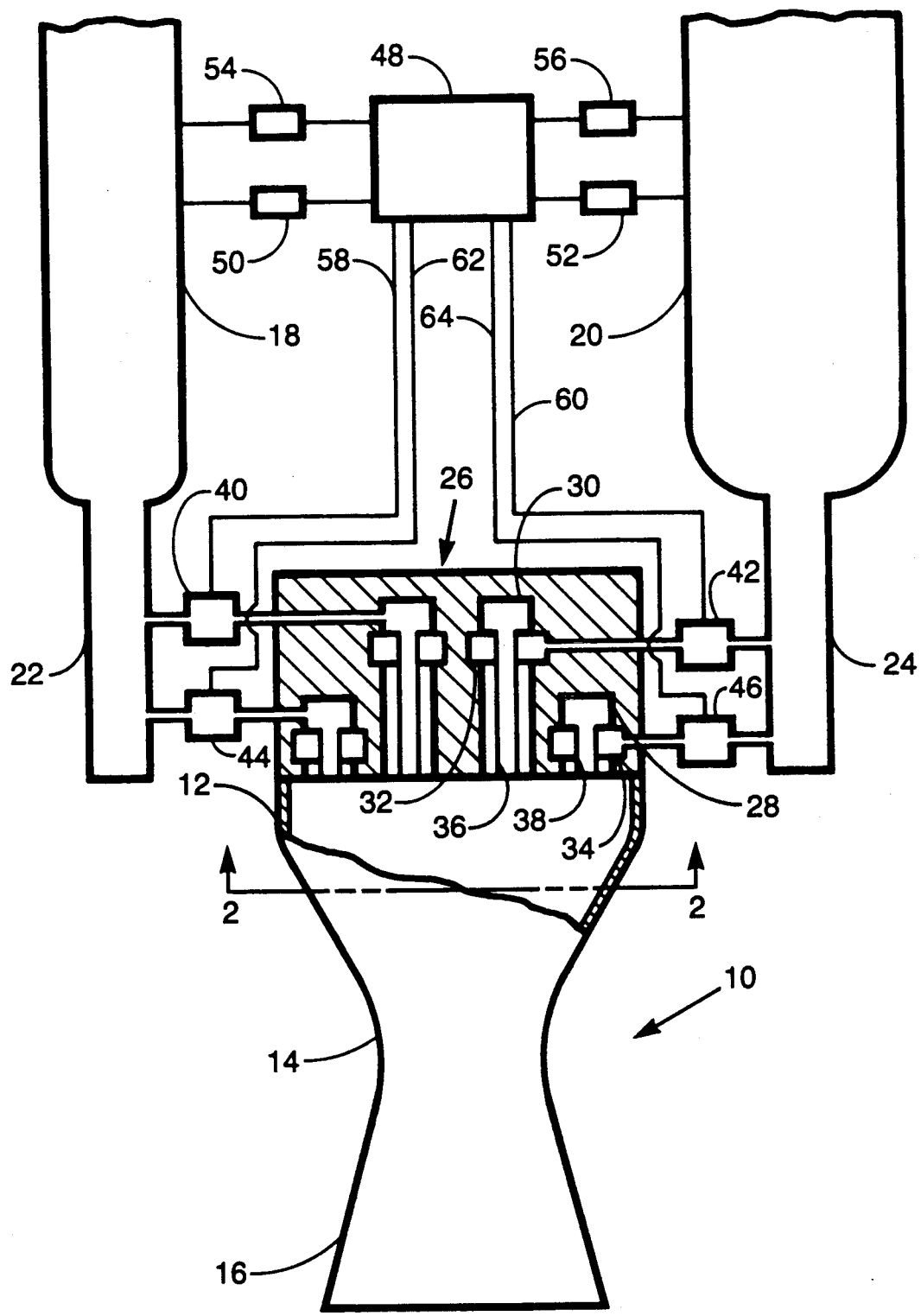
FIG. 1 is a schematic view of a rocket injector embodying the features of the invention.
Figure 2:
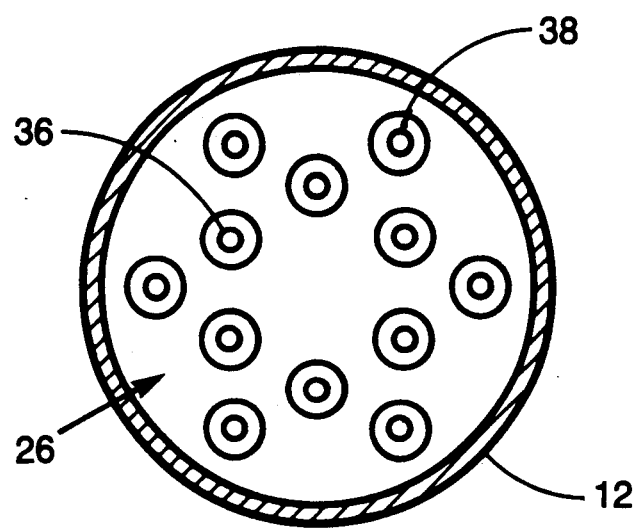
FIG. 2 is a section view taken along the line 2—2 in FIG. 1.

Referring now to the drawing, there is shown a rocket motor 10 in the form of an annular hollow elongated enclosure. This rocket motor includes an upstream cylindrical combustion chamber 12, an adjacent downstream convergent-divergent throat section 14, and an exhaust nozzle 16. Liquid propellants are stored in tanks 18 and 20. By way of illustration, the tank 18 contains an oxidizer, such as liquid oxygen, while a fuel, such as liquid hydrogen, is stored in the tank 20.

These propellants are supplied to the rocket 10 from the tanks 18 and 20 through a propellant feed system. Liquid oxidizer is supplied to the rocket 10 through a line 22 while a similar line 24 supplies liquid fuel to the rocket combustion chamber 12 through an injector 26.

According to the present invention, the injector 26 utilizes a plurality of manifolds 28, 30, 32 and 34 with connected injector elements 36 and 38. The set of manifolds 30 and 32 uses a set of valves 40 and 42 to control fluid flow through the connected injector elements 36 to the rocket chamber. The set of manifolds 28 and 34 uses the set of valves 44 and 46 to control fluid flow through the connected injector elements 38. The set of manifolds 30 and 32 with connected injector elements 36 is operated parallel to the set of manifolds 28 and 34 with connected injector elements 38. Combined together they form the injector 26.

The control box 48 maintains the rocket thrust level in a predetermined design range by controlling the mass flow of propellants through the injector 26. This control box 48 is operably connected to the valves 40, 42, 44 and 46 which are opened and closed as needed to maintain the overall injector pressure drop within an acceptable range dictated by rocket combustion chamber stability criteria while admitting propellants with a wide inlet temperature/pressure range to the injector elements. The pressure of the liquid oxidizer is supplied to the control box 48 by a pressure sensor 50 while a similar pressure sensor 52 supplies the pressure of the fuel to this control box. The temperature of the liquid oxidizer is supplied to the control box 48 by a temperature sensor 54 while a similar temperature sensor 56 supplies the temperature of the fuel to the control box.

In operation, if temperature sensors 54 and 56 sense cryogenic propellant temperatures and communicate this information to the control box 48, the control box sends signals via line 58 to valve 40 and via line 60 to valve 42 to open these valves and admit these cryogenic propellants to the manifolds 30 and 32 which are connected to injector elements 36. These injector elements are designed such that their pressure drop is within an acceptable range dictated by rocket combustion chamber stability criteria when cryogenic propellants are admitted to the injector. If the temperature sensors 54 and 56 sense ambient propellant temperatures and communicate this information to the control box 48, the control box sends signals via line 58 to valve 40 and via line 60 to valve 42 to open these valves and admit these ambient propellants to the manifolds 30 and 32 which are connected to injector elements 36.

In addition, the control box 48 sends signals via line 62 to the valve 44 and via line 64 to the valve 46 to admit these ambient propellants to the manifolds 28 and 34 connected to the injector elements 38. The ambient propellants flow in parallel through the injector elements 36 and 38. These injector elements are designed such that their pressure drop is within an acceptable range dictated by rocket combustion chamber stability criteria when ambient temperature propellants are admitted to the injector. More than two parallel sets of manifolds, injector elements and valves may be required to operate over the entire propellant temperature range of cryogenic to ambient.

While the preferred embodiment of the rocket motor has been disclosed it will be appreciated that various structural modifications may be made to the injector without departing from the spirit of the invention or the scope of the subjoined claims.

I claim:

1. In a fluid rocket having an injector of the type wherein liquid oxygen from a first tank and liquid hydrogen from a second tank are supplied to a combustor chamber through injector elements, the improvement comprising;

multiple sets of manifolds in said injector for feeding said liquid oxygen and liquid hydrogen to said injector elements so that said oxygen and hydrogen flow through said injector elements, control means for maintaining the rocket thrust level in a predetermined design range by determining which manifolds are connected to said first and second tanks thereby controlling the mass flow of the liquid oxygen and the liquid hydrogen through said injector, a first valve operably connected to one of said sets of manifolds and said first tank for selectively enabling said liquid oxygen to flow to one of said manifolds in said set, a second valve operably connected to said one of said sets of manifolds and said second tank for selectively enabling said liquid hydrogen to flow to the other of said manifolds in said set, a third valve operably connected to another of said sets of manifolds and said first tank for selectively enabling said liquid oxygen to flow to one of said manifolds in said other set, a fourth valve operably connected to said other of said sets of manifolds and said second tank for selectively enabling said liquid hydrogen to flow to the other of said manifolds in said other set, a first pressure sensor connected to said first tank for supplying the pressure of the liquid oxygen therein to said control means, a second pressure sensor connected to said second tank for supplying the pressure of the liquid oxygen to said control means, a first temperature sensor connected to said first tank for supplying the temperature of the liquid oxygen therein to said control means, a second temperature sensor connected to said second tank for supplying the temperature of the liquid hydrogen to said control means, and means for operably connecting said control means to said first, second, third, and fourth valves for opening and closing the same in response to the sensed pressures and temperatures thereby controlling the rocket thrust level whereby only said first and second valves are opened when cryogenic temperatures are sensed and said first, second, third and fourth valves are opened when ambient temperatures are sensed.

2. Apparatus as claimed in claim 1 wherein the sets of manifolds are connected in parallel to said injector.

* * * * *